(12) United States Patent
Comazzetto

(10) Patent No.: US 11,190,411 B1
(45) Date of Patent: Nov. 30, 2021

(54) THREE-DIMENSIONAL GRAPHICAL REPRESENTATION OF A SERVICE PROVIDER NETWORK

(71) Applicant: Amazon Technologies, Inc., Seattle, WA (US)

(72) Inventor: Angelo Comazzetto, Coldstream (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/581,696

(22) Filed: Sep. 24, 2019

(51) Int. Cl.
*H04L 12/24* (2006.01)
*G06T 19/20* (2011.01)

(52) U.S. Cl.
CPC .............. *H04L 41/22* (2013.01); *G06T 19/20* (2013.01); *G06T 2219/2016* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,356,883 | B1 * | 5/2016 | Borthakur | ........... H04L 41/5051 |
| 2002/0149615 | A1 * | 10/2002 | Rajarajan | ................ G06F 9/451 |
| | | | | 715/738 |
| 2013/0080641 | A1 * | 3/2013 | Lui | ....................... H04L 43/045 |
| | | | | 709/226 |
| 2015/0035823 | A1 * | 2/2015 | Arsan | ..................... G06T 15/20 |
| | | | | 345/419 |
| 2015/0040017 | A1 * | 2/2015 | Roche | ..................... G06F 11/32 |
| | | | | 715/736 |
| 2017/0070594 | A1 * | 3/2017 | Oetting | ............... G06F 3/04815 |
| 2017/0091972 | A1 * | 3/2017 | Pearcy | .................... G06F 21/50 |
| 2018/0091413 | A1 * | 3/2018 | Richards | ................. H04L 43/14 |

* cited by examiner

*Primary Examiner* — Kee M Tung
*Assistant Examiner* — Khoa Vu
(74) *Attorney, Agent, or Firm* — Lee & Hayes, P.C.

(57) ABSTRACT

Technologies are disclosed for generating a three-dimensional graphical representation of a service provider network. The three-dimensional graphical representation may include one or more visual indicators representing one or more resources of the service provider network. For instance, a system may use one or more Application Program Interface (API) commands to identify the one or more resources of the service provider network (e.g., databases, servers, virtual machines, cloud applications, etc.) and generate virtual three-dimensional objects to represent the resources. In some examples, virtual three-dimensional objects may have attributes based on data generated from the one or more resources, an permission setting, and/or a potential resource status. The system may present one or more interactive element(s) for navigating the three-dimensional graphical representation. The system may generate instances that represent, for example, historical data from the service provider network. Multiple instances (e.g., representing different time periods) may be generated and presented simultaneously.

20 Claims, 8 Drawing Sheets

THREE-DIMENSIONAL GRAPHICAL REPRESENTATION OF A SERVICE PROVIDER NETWORK

BACKGROUND

Network services (e.g., "cloud" systems) often comprise many different virtual services distributed throughout servers and databases around the world. These systems are in a continuous state of change as users are added, data is generated, initial services are provided, and new services are added and removed. Multiple user accounts with different security settings accessing the network services via a wide variety of device types further add to the complexities of attempting to visualize the network.

People tasked with understanding and managing network services (e.g., IT system engineers, software developers, business developers, cloud service providers, etc.) typically use whiteboards and PowerPoint slides to illustrate a particular portion of the network, how that portion interacts with other portions of the network, and how a change to one portion of the network may affect other portions. Although third-party design software (e.g., Visio®) has made network conceptualizing easier, like whiteboards and PowerPoint, these tools generally provide static, two-dimensional visualizations (e.g., flow-charts, block diagrams, etc.). Furthermore, attempts to automate visualization techniques and to provide accurate visualizations struggle because application programming interfaces (APIs) supporting the different services of the network may vary in the degrees to which they generate data, store data, and make data accessible.

Accordingly, existing tools for visualizing network services are plain, generally static, incomplete, and labor-intensive to produce.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
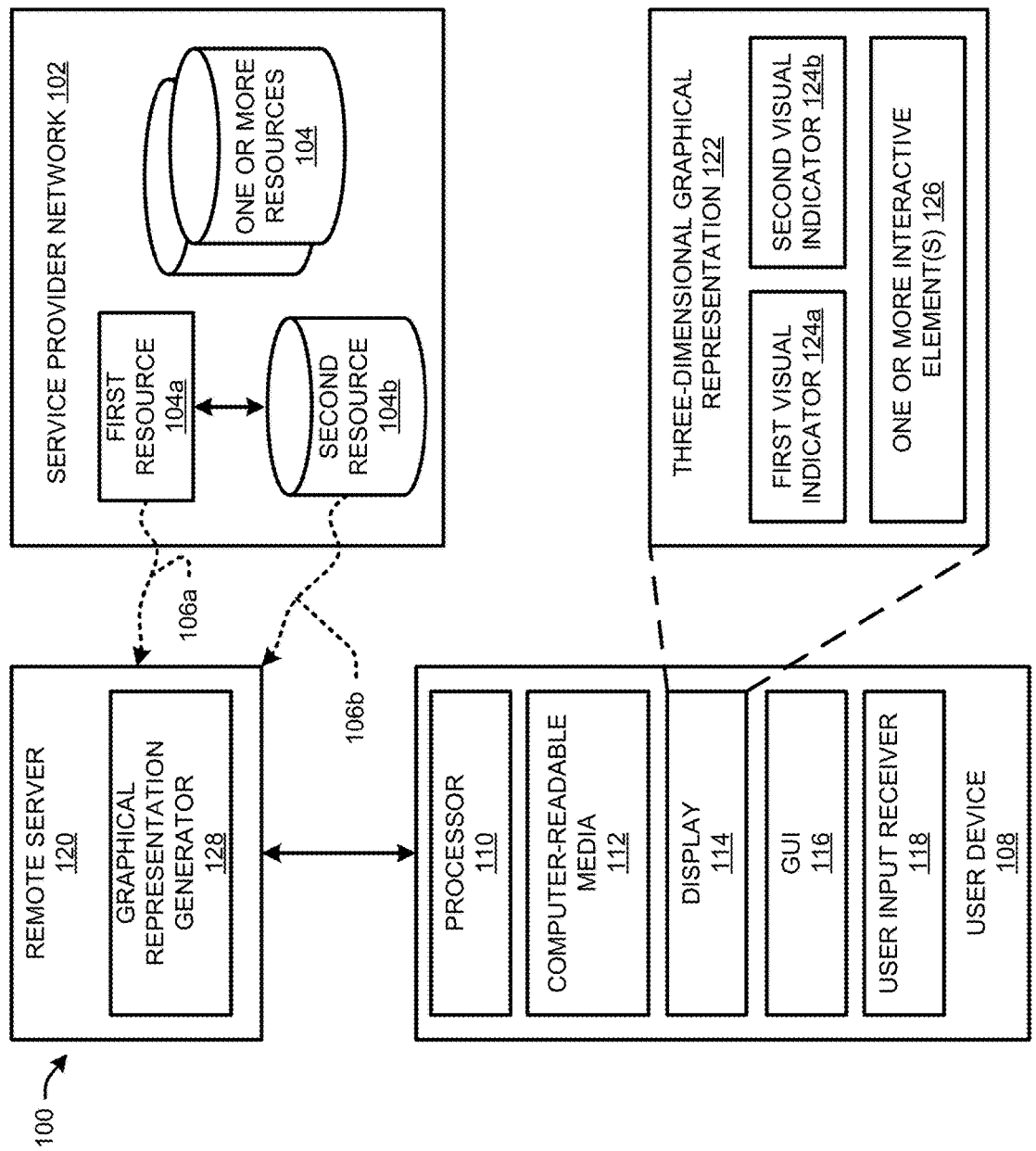
FIG. 1 depicts a schematic diagram of a first example system including at least a three-dimensional graphical representation of a service provider network.

The following detailed description is directed to system(s) and processes for generating and presenting a three-dimensional graphical representation of a service provider network. The service provider network may comprise one or more resources that provide network services to a user associated with a customer account and/or one or more user accounts. The system(s) may receive a request to generate the three-dimensional graphical representation and, in response, identify the one or more resources and/or receive data from the one or more resources. The three-dimensional graphical representation may be rendered on a display and may include visual indicators based on the data received from the one or more resources. For instance, the visual indicators may include three-dimensional objects and/or attributes of the three-dimensional objects that correspond to data representing network hardware and/or software, virtual instances, performance statistics, storage information, and/or information about operations performed at the one or more resources. As such, a plurality of the visual indicators may combine to form the three-dimensional graphical representation of the service provider network, such that the service provider network can be visually represented, understood, and monitored.

In some examples, the system(s) may include a graphical representation generator for generating the three-dimensional graphical representation. The graphical representation generator may perform multiple functions, such as receiving or otherwise obtaining data from a wide variety of different resources and different types of resources of the service provider network, generating visual indicators, generating and storing a mapping of the resources to the visual indicators, determining arrangements of the visual indicators within the three-dimensional graphical representation, and providing updates to the visual indicators as the system(s) receive updated data from the resources. The graphical representation generator may perform other data visualization techniques to convert raw data collected from the resources into the three-dimensional graphical representation to be rendered by the user device. Accordingly, the system(s) may generate multiple different and dynamic visual indicators representing a wide variety of different resources and attributes of the different resources.

In some examples, the system(s) may include one or more interactive element(s). For instance, a graphical user interface (GUI) may render a navigation icon for causing a navigation event (e.g., a zoom event, a rotate event, and/or a shift event) within the three-dimensional graphical representation upon being actuated by a user input. The one or more interactive element(s) may comprise an instance generator that, upon being actuated by the user input, causes the system(s) to generate an instance of the three-dimensional graphical representation (e.g., a particular version of the three-dimensional graphical representation that considers additional parameters). In some examples, multiple instances may be generated and presented substantially simultaneously.

In some examples, the system(s) may present a visual indicator having an attribute based at least partly on an permission setting. For instance, the system(s) may determine the permission setting associated with the request and present the visual indicator with the attributes based on determining that the user is authorized to view some resources and/or unauthorized to view other resources. In some examples, one or more visual indicators may represent a resource that the system(s) determines to comprise a potential resource status, and the system(s) may present the visual indicator with an attribute indicating the potential resource status.

In some examples, the system(s) disclosed herein may generate the three-dimensional graphical representation of the service provider network automatically and/or with minimal user inputs (e.g., one user input, two user inputs, three user inputs, less than five user inputs, etc.). For instance, the system(s) may use API commands to efficiently identify and gather information from the resources of the service provider network (rather than simply using manual techniques) and may automatically update the three-dimensional graphical representation as new data becomes available. Accordingly, in some examples, the system(s) may reduce labor requirements, memory requirements, processing power, and an amount of time for generating a visualization of the service provider network, i.e., the three-dimensional graphical representation. Moreover, the system (s) may provide techniques for navigating and manipulating the three-dimensional graphical representation such that information about the service provider network may be more accessible, more intuitive, and generally easier to comprehend and discuss for technical personnel and non-technical personnel alike. The system(s) may provide techniques for identifying changes to the service provider network, documenting a configuration state (e.g., an "instance") of the service provider network, for instance, for auditors, or assist with compliance efforts by comparing differences in the service provider network across different points in time.

FIG. 1 depicts an example system 100 that may include a service provider network 102 comprising one or more resources 104. The one or more resources 104 may comprise at least portions of network resources or services associated with a customer account and/or one or more user account, such as one or more of a server, a database, a data log record, an elastic container instance, a security or threat detection service (e.g., AWS GuardDuty), an auditing or compliance service (e.g., AWS CloudTrail), a data communication service, a network service, an analytics service, a developer tool, a system management tool, an enterprise application, combinations thereof, and/or other types of resources that may form a part of the service provider network 102. The one or more resources 104 may comprise an object component of the service provider network 102 (e.g., a hard drive, an Amazon S3 bucket, a server, etc.) and/or a network component of the service provider network 102 (e.g., a packet flow log, a data traffic level between network nodes, etc.). The one or more resources 104 may comprise data processing resources available as physical computers or VM instances in a variety of different configurations. The VM instances may be configured to execute applications, including web servers, servers, media servers, database servers, some or all of the network services described herein, and/or other types of programs. The one or more resources 104 may comprise data storage resources that include file storage devices, block storage devices, etc. The one or more resources 104 of the service provider network 102 may comprise a plurality of APIs commands for exchanging information as the one or more resources 104 perform the network services or functions.

In some examples, the one or more resources 104 may comprise a first resource 104a and/or a second resource 104b, although any number of resources 104 is contemplated herein. The first resource 104a may generate or otherwise be associated with first data 106a. The second resource 104b may generate or otherwise be associated with second data 106b. Alternatively, the first resource 104a may generate or otherwise be associated with the second data 106b. Moreover, the first data 106a and the second data 106b may be generated from or otherwise describe one or more attribute of a single resource (e.g., different attributes of the first resource 104a) or a single attribute of the single resource under different parameter variations, e.g., representing a same resource attribute but at different times.

The first data 106a may comprise a first type of data and the second data 106b may comprise a second type of data that is different than the first type of data. Alternatively, the first type of data may be a same type of data as the second type. In either case, the first data 106a and/or the second data 106b may indicate one or more attributes of the one or more resources 104. For instance, the first data 106a and/or the second data 106b may indicate a geographic location, a unique identifier, a device specification (e.g., a storage capacity, a processing capacity, a size dimension, a date of manufacture, etc.), a temperature, current usage data, upstream/downstream node identifiers, activity data logs, data file lists, compatibilities, permission settings, or combinations thereof associated with the one or more resources 104 (e.g., the first resource 104a, the second resource 104b, etc.). The first data 106a and/or second data 106b may be generated be the one or more resources 104 (e.g., the first resource 104a and/or the second resource 104b) when the one or more resource 104 perform computing operations.

In some embodiments, the first data 106a may relate to (e.g., be generated by, received from, or otherwise associated with) the first resource 104a, and the second data 106b may relate to the second resource 104b, which may be a different and/or separate resource from the first resource 104a. For instance, the first data 106a may be related to a hard drive and the second data 106b may be related to a server. The first data 106a may be related to a database and the second data 106b may be related to traffic flow to and/or from the database. The first data 106a may be related to resource(s) in a first geographic region and the second data 106b may relate to resource(s) in a second geographic region. The first data 106a may be related to the object component of the service provider network 102 (e.g., a hard drive, an Amazon S3 bucket, a server, etc.), and the second data 106b may be related to the network component of the service provider network 102 (e.g., a packet flow log, a data traffic level between network nodes, etc.). The system 100 may receive any variations of the first data 106a and the second data 106b from any of the types of the one or more resources 104 discussed above, which may be repeated, combined, and multiplied as the system 100 scales up to receive data indicating attributes of hundreds, thousands, or even millions of different resources that comprise the service provider network 102. In some instances, the first data 106a and/or the second data 106b may indicate an occurrence or existence of a service of the resource as part of the service provider network 102 while omitting some of the other data discussed above.

In some examples, the system 100 may further include a user device 108. The user device 108 may comprise any type of computing device, such as a mobile phone device (e.g., smartphone), a laptop computer, a personal computer ("PC"), a desktop or workstation computer, a personal digital assistant ("PDA"), a wearable-computing device (e.g., glasses, watch, necklace, contact lens, epidermal, etc.), a virtual reality (VR) or augmented reality (AR) headset/device, a holographic device, a stand-alone computer (e.g., raspberry pi, an external drive, etc.), an electronic book (eBook) reader device, a gaming console, a set-top-box, a server computer, a tablet computing device, a home-automation device, a voice-interface device, a consumer electronic device, or combinations thereof. The user device 108 may include a processor 110, computer-readable media 112, a display 114 upon which the processor renders a graphical user interface (GUI) 116, and/or combinations thereof.

In some embodiments, the processor 110 may comprise one or more processor(s) such as a microprocessor, a microcomputer, a microcontroller, a digital signal processor, a central processing unit (CPU), a graphics processing unit (GPU), or combinations thereof, etc. Among other capabilities, the processor 110 may operate to fetch and execute computer-readable instructions stored in the computer-readable media 112 to perform the operations disclosed herein.

In some examples, the computer-readable media 112 may comprise one or more non-transitory storage devices such as phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), field-programmable gate arrays (FPGA), digital versatile discs (DVD) or other optical storage, magnetic cassettes, magnetic tape, magnetic disk storage or other magnetic storage devices, genetic encoding storage device, other medium that can be used to store information in one or more databases for access by an electronic device, or combinations thereof.

In some instances, the user device 108 may access the service provider network 102 and/or services provided by the service provider network 102. In some examples, the service provider network 102 may provide the network services to another computing device that is different from and/or located remotely from the user device 108.

The user device 108 may store at the computer-readable media 112 one or more applications for communicating with the remote server 120 and/or the service provider network 102. The one or more applications may utilize any number of communication methods to communicate across the network including remote procedure calls, SOAP-based web services, remote file access, proprietary client-server architectures, and the like. In some instances, the application may provide the GUI 116 by accessing the computer-readable media 112 with the processor 110. In some examples, the user device 108 may receive one or more user inputs via a user input receiver 118. For instance, the user input receiver 118 may comprise a portion of the GUI 116, a touchscreen, a touchpad, a microphone, a camera, a motion sensor, or any other component for receiving the user input (e.g., at the user device 108 or remote from the user device 108) and/or transforming the user input into data (e.g., via a transformed voltage signal) representing information of the user input.

In some embodiments, the system 100 may comprise a remote server 120. The remote server 120 may communicate with the user device 108, the service provider network 102, and other computing devices of the system 100 via a network, such as a local-area network ("LAN"), a wide-area network ("WAN"), the Internet, or any other networking topology for connecting one or more computing devices. The remote server 120 may comprise a processor (which may be different, similar, or identical to the processor 110) and/or computer-readable media (which may be different, similar, or identical to the computer-readable media 112). The remote server 120 may, in some instances, comprise one or more servers housed in data centers. The data centers may comprise facilities for housing and operating computer systems and associated components and may include redundant and backup power, communications, cooling, and security systems. The data centers may also be located in geographically disparate locations. The remote server 120 may, in some examples, be operated by a service provider that also provides the one or more resources 104.

In some examples, the remote server 120 may execute one or more applications (e.g., of the service provider) for performing one or more steps of any of the systems discussed herein. For instance, the remote server 120 may perform one or more steps for generating a three-dimensional graphical representation 122 of the service provider network 102. In some examples, the user device 108 may perform at least one or more of the steps of receiving the user input(s) and/or rendering the three-dimensional graphical representation 122. The remote server 120 may perform at least one or more steps of identifying the one or more resources 104, receiving data from the one or more resources 104, associating the data with one or more visual indicators, identifying a resource having a potential resource status, generating an instance of the three-dimensional graphical representation 122, instructing the user device 108 to render the three-dimensional graphical representation 122, and/or combinations thereof. Any steps discussed herein as being performed by the user device 108 may be performed by the remote server 120 and any steps discussed herein as being performed by the remote server 120 may be performed by the user device 108.

In some embodiments, the three-dimensional graphical representation 122 may be rendered at the user device 108. For instance, the three-dimensional graphical representation 122 may be rendered on the display 114 of a mobile device or a laptop (e., a two-dimensional screen, a curved screen, a flexible screen, a translucent screen, etc.), and/or as a three-dimensional interactive environment on a VR headset or hologram system.

In some embodiments, the three-dimensional graphical representation 122 may include one or more visual indicators representing data generated by and/or received from the service provider network 102 (i.e., the one or more resources 104 of the service provider network 102). A first visual indicator 124a may comprise a first visual representation of one or more attributes that correspond to the first data 106a. For instance, the first resource 104a may comprise a database type of resource, and the first visual indicator 124a may comprise a first particular shape (e.g., a cube shape) to indicate a first type of resource (e.g., the database type). A second visual indicator 124b may comprise a second visual representation of one or more attributes that correspond to the second data 106b. For instance, the second resource 104b may comprise a server device type of resource, and the second visual indicator 124b may comprise a second particular shape (e.g., a pyramid shape) to indicate a second type of resource (e.g., the server type). The three-dimensional graphical representation 122 may comprise a third visual indicator, which may comprise a third visual representation of a data connection between the one or more resources 104, such as between the first resource 104a represented by the first visual indicator 124a and the second resource 104b represented by the second visual indicator 124b. The three-dimensional graphical representation 122 may comprise a fourth visual indicator, a fifth visual indicator, hundreds of visual indicators, or even thousands of visual indicators to represent any number of the one or more resources 104, attributes of the one or more resources 104, and interactions between the one or more resources 104 that form the service provider network 102.

In some examples, as discussed above, the second visual indicator 124*b* may comprise a different virtual three-dimensional object than the first visual indicator 124*a* and, as such, may represent a different resource of the one or more resources 104 than the first visual indicator 124*a*. However, in some examples, the first visual indicator 124*a* may represent a first attribute of the first resource 104*a* (e.g., the cube shape representing the database type), and the second visual indicator 124*b* may represent a second attribute of the same, first resource 104*a*. For instance, the second visual indicator 124*b* may comprise a shape, a color, a shade, a position, and/or a virtual location, which may represent the second attribute of the first resource 104*a*, such as a storage capacity, an activity status, a last time of use, a geographic location etc. In fact, any number of visual indicators may represent any number of the attribute(s) of the first resource 104*a*. By representing attributes of the one or more resources 104 (e.g., based on data received from the one or more resources 104, such as the first data 106*a* and/or the second data 106*b*), the visual indicators may cause the three-dimensional graphical representation 122 to be a visual portrayal of the service provider network 102. The visual portrayal may continuously update as the system 100 receives updated data from the one or more resources 104 of the service provider network 102.

In some embodiments, the system 100 may include one or more interactive element(s) 126 for, upon being actuated, navigating the three-dimensional graphical representation 122, generating and presenting one or more instance(s) of the service provider network 102 (e.g., that represent a particular historical time or time range), detecting and presenting resources that may be available to add to the service provider network 102, (e.g., that have a potential resource status), or otherwise interacting with the three-dimensional graphical representation 122. For instance, the one or more interactive element(s) 126 may comprise one or more icons rendered at the user device 108, such that a selection or interaction with the icon via a user input (e.g., a swipe, a tap, a click, a hover, etc.) may cause an actuation of the one or more interactive element(s) 126. The one or more interactive element(s) 126 may comprise the visual indicators (e.g., the first visual indicator 124*a*, the second visual indicator 124*b*, etc.). In some instances, the one or more interactive element(s) 126 may comprise a trigger word, such that a voice command including the trigger word detected via a microphone may cause the actuation of the one or more interactive element(s) 126. In some instances, the one or interactive element(s) 126 may comprise a stored motion profile, such that a physical hand gesture or body motion detected via a motion sensor (e.g., camera) may, upon being determined to be similar to the stored motion profile within a confidence interval, cause the actuation of the one or more interactive element(s) 126.

In some examples, the system 100 may include a graphical representation generator 128. The graphical representation generator 128 may comprise a portion of an application or other software at the remote server 120, at the user device 108, at another computing device of the system 100, or combinations thereof. The graphical representation generator 128 may apply one or more data visualization techniques to generate the three-dimensional representation 122 from the data received (or otherwise associated with) the one or more resources 104. The one or more data visualization techniques, may include generating a time-series based on a single variable; ranking a subset in ascending or descending order based on a particular categorization; comparing a subset against a reference; generating a frequency distribution showing a number of observations of a particular variable for a particular interval; comparing two variables to determine if they tend to move in the same or opposite directions; nominally comparing two subsets, comparing a variable across a geospatial layout, or combinations thereof.

In some embodiments, the graphical representation generator 128 may assign and/or store associations of one or more visual indicator files, attribute files, distance, and/or connector files with a resource identifier associated with a particular resource of the one or more resources 104. Upon receiving data from the particular resource of the one or more resources 104, the graphical representation generator 128 may assign a particular visual indicator file to the particular resource to generate the visual indicator. For example, the graphical representation generator 128 may determine a resource type of the particular resource (e.g., "server") and, based on the resource type, determine a visual indicator file (e.g., "sphere") to assign to the particular resource. In this embodiment, spheres may represent servers, cubes may represent databases, pyramids may represent applications, and/or any combination thereof.

The graphical representation generator 128 may assign and store one or more attribute files to the resource identifier. The attribute files may comprise one or more characteristics of the visual indicator files that may adjust or change based on the data from the one or more resources 104. The graphical representation generator 128 may store an attribute file indicating a size, a shape, a color, texture, an outline, a sound, and/or an animation of the visual indicator. The graphical representation generator 128 may receive data indicating a processing capability of the particular resource (e.g. a RAM of 12 Gigabytes) and may assign and store an attribute file based on the processing capability. In other words, a diameter of the sphere representing the server may have a value based on the processing capability, such that the size of the sphere visually indicates the processing capability of the server represented by the sphere. For instance, a particular number of pixels (10 pixels, 20 pixels, 30 pixels, etc.), may represent a gigabyte of RAM. In some instance, an attribute file may be based on a storage capacity. For instance, a dimension of the cube 206 may have a value based on the memory storage capacity, such that the size of the cube 206 visually indicates the memory storage capacity of the database represented by the cube 206. In other words, a particular number of pixels (10 pixels, 20 pixels, 30 pixels, etc.) may represent a gigabyte of memory. In some examples, a color may represent a type of resource, a location of a resource, and/or an operating status of a resource. By way of example, a red color may indicate a resource having a performance warning or alert occur, or a blue color may indicate an operating temperature of a datacenter server, or a green color may indicate a particular country or geographic region.

In some examples, attributes of the one or more visual indicators may represent permission settings associated with the one or more resources 104. For instance, one or more color(s) (e.g., red, orange, yellow, green, blue, purple, white, gray, black) may represent one or more particular users or groups of users having different permission settings. In some examples, the text window 212 may present text or symbols conveying information to indicate the permission settings.

In some examples, the graphical representation generator 128 may generate and store an arrangement of the visual indicators with respect to each other within the three-dimensional graphical representation 122. The graphical representation generator 128 may determine a connection between the first resource 104a and the second resource 104b. For instance, the graphical representation generator 128 may determine that the first resource 104a is connected to the second resource 104b because the first resource 104a comprises a server (e.g., that may be represented by a first particular shape) and that the second resource 104b comprises a database (e.g., that may be represented by a second particular shape) receiving data from the first resource 104a. In some examples, the graphical representation generator 128 may determine that the first resource 104a is connected to the second resource 104b because the first resource 104a comprises a first database and the second resource 104b comprises a second database 104b that receives data from the first database. In any event, the graphical representation generator 128 may determine that some association between resources exists (e.g., a data connection, a geography, a common owner, etc.) and generate a connector between the visual indicators representing the association between the resources.

In some examples, the graphical representation generator 128 may perform other data visualization techniques to convert data collected from the one or more resources 104 into the three-dimensional graphical representation 122 to be rendered by the user device 108. The graphical representation generator 128 may establish communication channels with the one or more resources 104 (e.g., via API commands) and/or a data log receiving data based on the one or more resources 104, and cyclically receive updated data, and, based on the updated data, generate and assign new associations of visual indicator files, attribute files, and/or connector files, to reflect the updated data. Accordingly, the system 100 may generate multiple different and dynamic visual indicators representing a wide variety of different resources and different resource types having changing attributes to generate the three-dimensional graphical representation.

Figure 2:
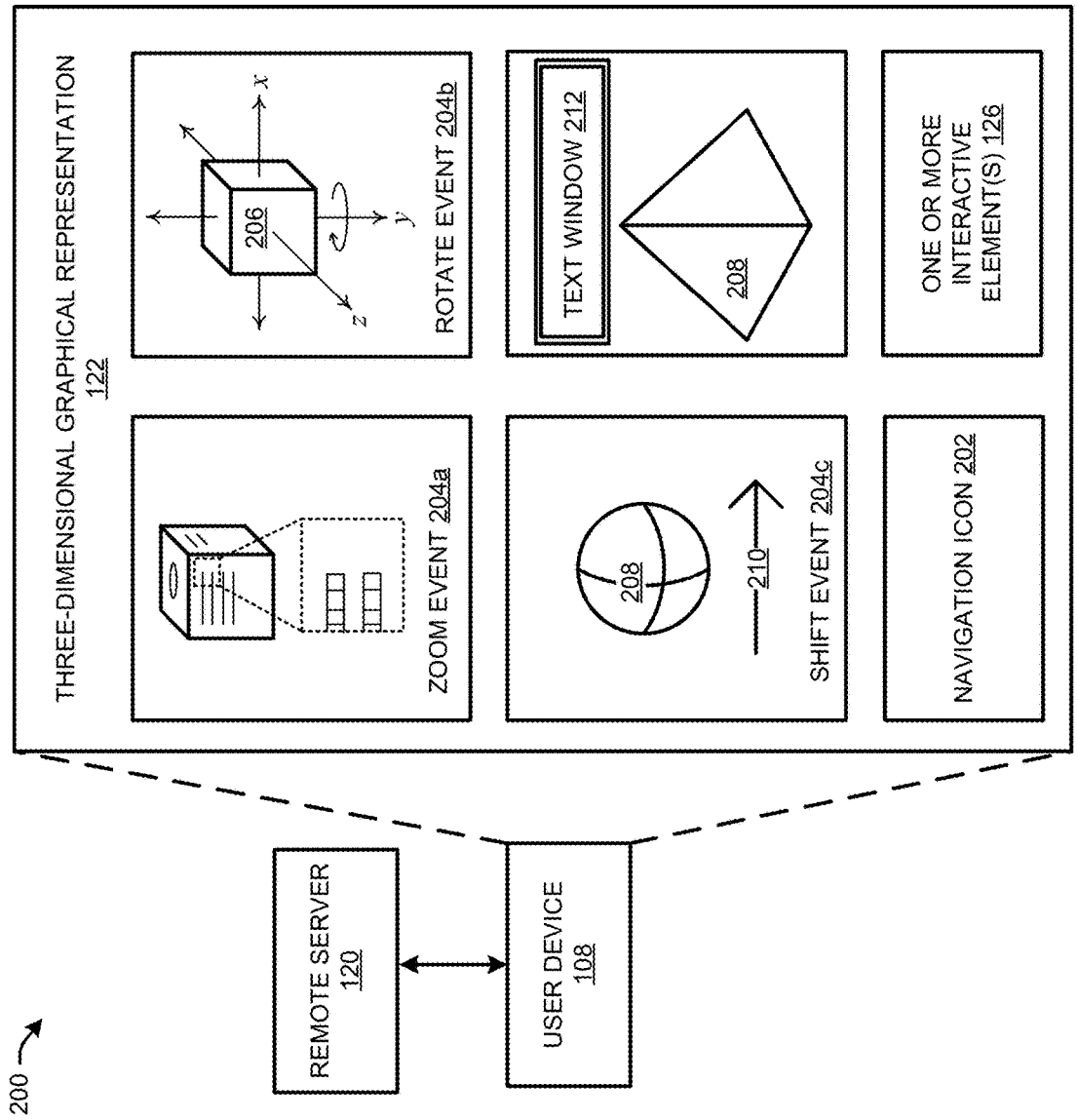
FIG. 2 depicts a schematic diagram of a second example system including one or more navigation events of the three-dimensional graphical representation.
Figure 3:
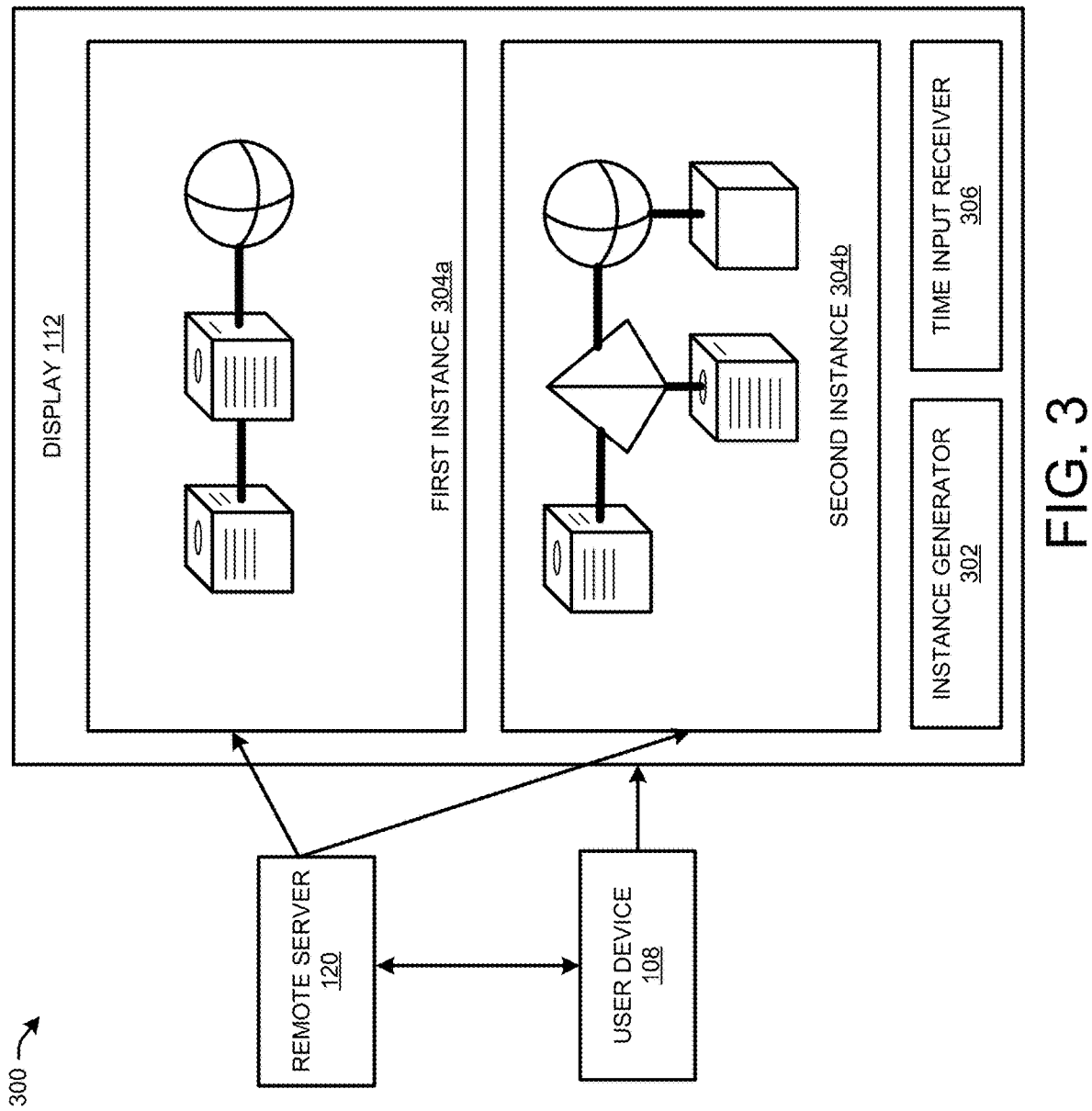
FIG. 3 depicts a schematic diagram of a third example system including at least one or more instances of the three-dimensional graphical representation.

FIG. 2 depicts an example system 200 that may, in some instances, form at least a portion of any of the systems discussed herein (e.g., the system 100 of FIG. 1, the system 300 of FIG. 3, etc.). The system 200 may comprise the user device 108, the remote server 120, and the three-dimensional graphical representation 122. The three-dimensional graphical representation 122 may include at least the first visual indicator 124a, the second visual indicator 124b, and/or the one or more interactive element(s) 126. The system 200 depicted in FIG. 2 may include components for viewing and interacting with the three-dimensional graphical representation 122, such that information about the service provider network 102 may be portrayed as an interactive virtual environment with visual indicators spatially orientated to convey information in an intuitive and interactive manner.

In some embodiments, the one or more interactive element(s) 126 may comprise a navigation icon 202. The system 200 may cause a navigation event or command to occur in response to receiving a user input that causes an actuation of the navigation icon 202. The navigation event may comprise one or more of a zoom event 204a, a rotate 204b, a shift event 204c, any other manipulations of visual indicators that may occur in a three-dimensional environment, or combinations thereof.

For instance, the zoom event 204a may be in response to an interaction directed at the first visual indicator 124a, such as a first side of a cube 206. The zoom event 204a may comprise a portion of the three-dimensional graphical representation 122 that may include the first visual indicator 124a being expanded to present a larger portion of the three-dimensional graphical representation 122 on the GUI 116 and/or to present additional details that were previously smaller or less clearly visible on the GUI 116 prior to the zoom event 204a. The additional details may include the second visual indicator 124b. For instance, the zoom event 204a may be associated with a first pixel area (e.g., 100×100 pixels) on the GUI 116. The first pixel area may be based on a user selection, an open-window size, a device preference, a curser location, or combinations thereof. The first pixel area may include the second visual indicator 124b and/or a trigger associated with the second visual indicator. Upon receiving an actuation at the one or more interactive element 126, the zoom event 204a may cause the system 200 to determine the second data 106a corresponding to the second visual indicator 124b (e.g., by determining the second resource 104b associated with the portion of the three-dimensional graphical representation 122 at which the zoom event 204a occurs) and presenting the second visual indicator 124b in a second pixel area (e.g., 100×100 pixels, 200×200 pixels, 300×300 pixels, etc.). The second pixel area may be presented in response to the actuation of the navigation icon 202 causing the zoom event 204a, and may include enlarged, expanded, and/or more detailed presentation of the second data 106b via the second visual indicator 124b. As such, the zoom event 204a may include a zoom from the first visual indicator 124a (e.g., representing the first data 106a) to the second visual indicator 124b (e.g., representing the second data 106b). The second visual indicator 124b may or may not be visible prior to the zoom event 204a based at least partly on the level of zoom, the first pixel area size, and/or a screen size displaying the graphical user interface 116, etc. In some examples, second data 106b may comprise a more detailed or more granular collection of data related to first data 106a, or first data 106a may be a higher-level or more abstract version of second data 106b. For instance, first data 106a may comprise a resource identifier (e.g., "Virginia Server #0001) and the second data 106b may comprise more detailed data related to the first data 106a (e.g., "RAM: 12 Gigabytes," "Datacenter location: 5A," "Manufacturer: Cisco," etc.) The zoom event 204 may cause the GUI to expand a visual area representing the first data 106a (e.g., the resource identifier associated with the resource) to include the second data 106b (e.g., additional detailed information related to the resource). As such, the zoom event 204a may cause data to be displayed in a more detailed or more granular form. In some examples, the zoom event 204a may occur in response to receiving a performance warning, alerts, or alarms (e.g., via AWS CloudWatch), and may comprise a zoom to a particular portion of the three-dimensional representation 122 that represents a portion of the service provider network 102 related to or affected by the performance warning. In some examples, the system 200 may scan in intervals of about every 10 seconds (or any other time period) for performance warnings, alerts, or alarms.

The rotate event 204b may occur in response to an interaction directed at the first visual indicator 124a, for instance, represented as a three-dimensional object 208 (e.g., the cube 206). The rotate event 204b may be in response to a click-and-drag of the three-dimensional object 208 that the user selects for rotation. The rotation event 204b may comprise at least a portion of the three-dimensional object 208 (or a portion of the three-dimensional graphical representation 122 more generally) that may include the first visual indicator 124a, being rotated about one or more axes within the virtual space of the three-dimensional graphical representation 122, such that another portion of the three-dimensional object 208 including the second visual indicator 124b becomes visible. For instance, the rotation event 204b may include rotating the three-dimensional object 208 (e.g., the cube 206) such that a first portion of the three-dimensional object 208 (e.g., the first side of the cube 206) containing the first visual indicator 124a rotates away from a plane parallel to the display 114 and moves out of view, and a second portion of the three-dimensional object 208 (e.g., the second side of the cube 206) containing the second visual indicator 124b rotates towards the plane and moves into view (e.g., at least when the rotation event 204b is about an x-axis and/or an y-axis). As such, the rotation event 204b may include a rotation from the first visual indicator 124a to the second visual indicator 124b. In some examples, a rotation magnitude (e.g., an amount of degrees/radians of rotation) may be based on a user input magnitude such as a speed or length of a swipe, a pressure value, a click-and-hold duration, etc.). In some instances, the rotate event 204b may cause data to be displayed and/or omitted from being displayed. For instance, a first side of the cube 26 (or three-dimensional object 208 more generally) may present the first indicator 124a representing first data 106a. For example, the first data 106a may comprise resource specifications (e.g., processing capacity, storage capacity, etc.) and the first visual indicator 124a may comprise a textual or otherwise visual description of the resource specifications. The second visual indicator 124b may comprise the second side of the cube 206 and may include a textual or otherwise visual description of other network nodes (e.g., upstream nodes and/or downstream nodes) communicating with the resource. In a first view (e.g., prior to the rotate event 204b) the first visual indicator 124a may be presented on the GUI (e.g., substantially parallel to the display) with the second visual indicator 124b (e.g., assigned to the second side of the cube 206) at least partially omitted. Upon occurrence of the rotate event 204b, the cube 206 may appear to rotate such that the first side is rotated at least partially out of view and the second side is rotated at least partially into view. As such, the rotate event 204b may cause the system 100 to display the second data 106b (e.g., indicating related network nodes) at least partially in place of where the first data 106a (e.g., indicating resource specification) was displayed prior to the rotate event 204b.

The shift event 206c may occur in response to an interaction directed at the first visual indicator 124a, for instance, represented as the three-dimensional object 208 (e.g., the cube 206). The shift event 204c may be in response to a click-and-drag, click-and-hold, and/or other interaction within the environment of the three-dimensional virtual representation 122 and/or with the one or more interactive element(s) 126. The shift event 204c may include a shift in virtual three-dimensional space of the three-dimensional graphical representation 122, the shift having a component in one or more directions of the x-axis, the y-axis, and/or the z-axis. The shift event 204c may include a shift magnitude corresponding to the user input magnitude causing the actuation of the navigation icon 202 and/or causing the shift event 204c. In some examples, the shift event 204c may include a visual traversal across a surface of the three-dimensional object 208 (e.g., the first side of the cube 206) and/or a traversal of virtual three-dimensional space from a first three-dimensional object 208 to a second three-dimensional object 208 located along a traversal line 210 of the shift event 204c. The shift event 204c may include the first visual indicator 124a appearing to move in virtual three-dimensional space along the traversal line 210, the first visual indicator 124a sliding at least partially out of view along the traversal line 210, the second visual indicator 124b moving in virtual three-dimensional space along the traversal line 210, the second visual indicator 124b sliding into view along the traversal line 210, or combinations thereof.

In some instances, the zoom event 204a, the rotate event 204b, and/or the shift event 204c may cause a change in view of at least a portion of the virtual environment represented by the three-dimensional graphical representation 122, such that more three-dimensional objects 208 or less three-dimensional objects 208 representing the one or more resource 104 are brought into view, out of view, and/or are rotated in the virtual three-dimensional space. As such, the zoom event 204a, the rotate event 204b, and/or the shift event 204c may cause data represented by different the visual indicators to come into view, go out of view, be presented in a more granular or higher-level form, etc.

In some examples, one or more visual indicators may comprise text, text bubbles, and/or text windows that may appear to hover above or near the three-dimensional object 208 and/or may be layered at least partially over the three-dimensional object 208. For instance, a text window 212 may provide any of the information that may be indicated by the data (e.g., the first data 106a, the second data 106b, etc.) such as a resource type, a resource identifier, available memory, security tag information, traffic flow rates, combinations thereof, and/or any other data discussed herein. In some examples, the text window 212 may appear in response to the actuation of the one or more interactive element(s) 126, a user hovering a cursor, a finger, and/or a gaze over a portion of the GUI 116, a user selecting the three-dimensional object 208, or combinations thereof. For instance, upon determining that a finger or cursor is hovering over the three-dimensional object 208 (e.g., the cube 206) that includes the first visual indicator 124a for a predetermined amount of time, the system 200 may determine to present the text window 212 at least a predetermined distance from the three-dimensional object 208. The text window 212 may include the second visual indicator 124b, which may comprise text indicating the second data 106b. In some examples, the second data 106b indicated by the text window 212 may be related to a resource of the one or more resources 104 represented by the three-dimensional object 208 and/or the first visual indicator 124a. In other words, the text window 212 may provide additional information related to the one or more resources 104 represented by the three-dimensional object(s) 208 that are in proximity to the text window 212.

As noted above, the first visual indicator 124a may, in some instances, comprise the cube 206 and/or the first side of the cube 206. The second visual indicator 124b may comprise the second side of the cube 206, another cube, another three-dimensional object 208, and/or the text window 212. As such, the first visual indicator 124a, the second visual indicator 124b, and/or any number of additional similar, identical, or different visual indicators may form hundreds or thousands of three-dimensional objects 208 with particular shapes, sides, colors, movements, positions, connecting lines, and/or floating text windows representing at least a portion the service provider network 102. Visual indicators discussed herein (e.g., the first visual indicator 124a, the second visual indicator 124b, etc.) may appear as virtual objects (e.g., the three-dimensional object 208, the cube 206, etc.), attributes of virtual objects, connections between the virtual objects, distances, between virtual objects, other characteristics of the virtual environment or virtual three-dimensional space of the three-dimensional graphical representation 122.

In some examples, the one or more interactive element(s) 126 may comprise a filter icon. An actuation of the filter icon may cause the system 200 to display a filtered sub-portion of the three-dimensional graphical icon based on one or more filter criteria. The system 200 may receive the filter criteria (e.g., via a user input), and the filter criteria may include a resource type, a resource location, any of the resource attributes discussed above, and/or a permission setting.

For instance, actuation of the filter icon may cause the system 200 to arrange or color the three-dimensional objects 208 based on permission settings associated with the three-dimensional objects 208. The three-dimensional graphical representation 122 may present an indication of a user name or a permission setting associated with a user calling an API command at a particular resource (e.g., via the text window 212, a color, a shape, etc.), and present the permission setting of the particular resource such that it is visually indicated whether the user is authorized to call the API command for the particular resource. In some examples, the system 200 may generate, present, or export a list of permission settings associated with the one or more resources 104 and/or users accessing the service provider network 102. As such, security of the service provider network 102 may be assessed and permission settings of API commands can be quickly compared (e.g., based on color(s) representing the permission setting of the user and/or the API command) to permission settings associated with the one or more resources 104 (e.g., based on color(s) representing the permission setting of the one or more resources 104) in order to detect an unauthorized API command call.

FIG. 3 illustrates a system 300 that may be similar to, identical to, or form a portion of any of the systems discussed herein (e.g., the system 100, the system 200, etc.). The system 300 may include the user device 108, the remote server 120, and/or the three-dimensional graphical representation 122. The three-dimensional graphical representation 122 may include at least the first visual indicator 124a, the second visual indicator 124b, and/or the one or more interactive element(s) 126. The system 300 depicted in FIG. 3 may include components for generating one or more instances of the three-dimensional graphical representation 122. Accordingly, in some examples, historical information regarding the service provider network 102 may be displayed, and a performance of the service provider network 102 during a particular historical time period may be viewed.

In some examples, the one or more interactive element(s) 126 may comprise an instance generator 302 that, upon being actuated (e.g., via receiving a user input at the user device 108), generates the one or more instance(s) of the three-dimensional graphical representation 122. In some examples, an instance may comprise a single view of a particular version of the three-dimensional graphical representation 122 based on additional parameters. For example, the instance may represent a snapshot of the three-dimensional graphical representation 122 at a particular moment in time (e.g., "Jul. 4, 2016 12:00:00 am") with the visual indicators of the instance representing data that also corresponds to the particular moment in time, such that the instance looks into past performance and historical records of the service provider network 102. Rather than represent a single particular moment in time, the instance may comprise a version of a particular three-dimensional graphical representation 122 over a period of time represented by a time range (e.g., "Jul. 4, 2017 12:00:00 am to Aug. 4, 2017 12:00:00 am," "Aug. 26, 2019 10:30:33 am to Aug. 26, 2019 10:37:04 am," etc.). The instance may represent multiple moments in time and may be re-playable from a start time to an end time of the time range at various speeds. Data storage information, traffic flow, capacity utilizations, and other operational and performance information of the three-dimensional graphical representation 122 may be viewed, paused, fast-forwarded, and rewound. The instance may comprise a re-playable animation of three-dimensional graphical representation 122 representing any number of second, minutes, hours, days, weeks, months, years, etc.

In some examples, the instance may represent a historical time using previously-archived data associated with the one or more resources 104 (e.g., by determining and receiving previously-stored data that corresponds to a time input). In some examples, the instance may represent a present time, e.g., may comprise a live-feed of the service provider network 102, by generating the visual indicators based on a stream of updated data (e.g., data having a most current timestamp) received from the one or more resources 104 on a continuing or ongoing basis. In some examples, the instance may represent a future time by providing a predictive scenario of the service provider network 102 that generates visual indicators based on predictive data received, for instance, via a user input or a hypothetical scenario generator. In some examples, the hypothetical scenario generator may provide an interface for generating and/or moving three-dimensional objects 208 not currently representing the one or more resources 104 in order to depict hypothetical scenarios of the service provider network 102. In other words, the system 100 may include a "build-your-own" mode that generates three-dimensional graphical representations 122 based on the user input(s) rather than the data received from the one or more resources 104 so that hypothetical scenarios may be generated. The instance may represent a particular sub-portion or multiple sub-portions of the three-dimensional graphical representation 122 (e.g., representing a subset of the one or more resources 104). The particular sub-portion or multiple sub-portions may be selected via a user input.

In some examples, upon receiving a first actuation of the instance generator 302, the system 300 may generate a first instance 304a. The first instance 304a may be based on a first time input received by the system 300 that may include a first particular moment in time and/or a first time range. The system 300 may receive the first time input at a time input receiver 306 (e.g., an input field for receiving alpha-numeric text) that the system 300 may generate in response to the first actuation. The first input may include one or more time values indicating the first particular moment in time or the first time range for the first instance 304a to represent. The system 300 may generate a first timestamp based on the first input and may receive previously-stored data corresponding to the first timestamp that is associated with the one or more resources 104. The system 300 may generate the first instance 304a based on the previously-stored data such that the visual indicators represent the previously-stored data (e.g., comprise attributes based on the previously-stored data). The first instance 304a may comprise a snapshot of what the service provider network 102 was doing and/or how the service provider network was performing at the first particular moment in time or during the first time range. Accordingly, the first instance 304a may represent previously-occurring operations, activity, data storage, etc. of the service provider network 102.

In some examples, the system 300 may generate a second instance 304*b* of the three-dimensional representation 122. The second instance 304*b* may be generated in response to the first actuation of the instance generator 302 or in response to a second actuation of the instance generator 302 and may be generated using any of the techniques discussed above for generating the first instance 304*a*. The second instance 304*b* may be based on a second time input that may be different than the first time input. As such, the second instance 304*b* may include visual indicators that represent data corresponding to a second particular moment in time or a second time range that is at least partially different than the first moment in time or the first time range. The first time range may overlap with the second time range. The second instance 304*b* may be rendered substantially simultaneously with the first instance 304*a*, such that the first instance 304*a* and the second instance 304*b* may be presented together on the display 114 via the GUI 116. The first instance 304*a* may be rendered at a first portion of the display and the second instance 304*b* may be rendered at a second portion of the display that is separate from the first portion, adjacent to the first portion, and/or at least partially overlaps the first portion. In some embodiments, the system 300 may generate any number of instances of the three-dimensional graphical representation 122 (e.g., the first instance 304*a*, the second instance 304*b*, a third instance, a fourth instance, etc.) that may be presented on any number of portions of the display substantially simultaneously and/or sequentially.

In some embodiments, the system 300 may include one or more interactive element(s) 126 may include a context view changer. For instance, upon being actuated, the context view changer may apply one or more filters to the three-dimensional graphical representation 122. For instance, the context view changer may present visual indicators based on a CPU filter, a disk TOP filter, a network bandwidth filter, a transactional queue limit filter, or combinations thereof. In some examples, the system 300 may apply the filter in response to single user input at the context view changer.

In some examples, the system 300 may generate hypothetical scenarios such that performance parameters of the one or more resources 104 may be adjusted and the results of the adjusted performance parameters visualized. Upon generating any of the instances discussed herein, the system 300 may generate a report of the instance, for example, based on receiving a user input at a report generator icon. The report may include a textual or listed description of the data on which the visual indicators of the instance are based and/or one or more visualizations or snapshots of the three-dimensional graphical representation 122 included in the instance. In some embodiments, one or more instances may be savable and/or exportable.

Figure 4:
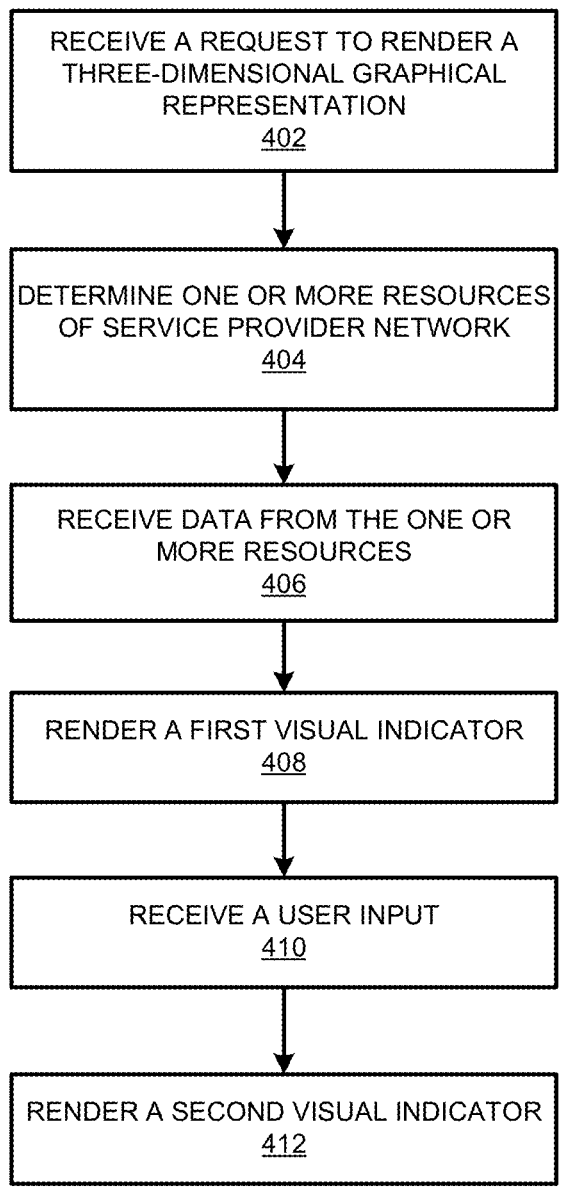
FIG. 4 depicts a flow diagram of a first example method for generating the three-dimensional graphical representation.

FIG. 4 depicts an example method 400 that may be performed by any of the systems discussed herein (e.g., the system 100, the system 200, the system 300, etc.). In some examples, the method 400 may include steps for rendering the one or more visual indicators (e.g., the first visual indicator 124*a*, the second visual indicator 124*b*, etc.) of the three-dimensional graphical representation 122. Although steps of the method 400 may be performed by any of the systems disclosed herein, the user device 108, the remote server 120, or combinations thereof, the steps are described below as being performed by the system 100 for brevity sake.

At step 402, the system 100 may receive a request to render the three-dimensional graphical representation 122. For instance, the system 100 may receive the user input requesting to render the three-dimensional graphical representation 122 at the user device 108. The user input may comprise an actuation of the one or more interactive element(s) 126. The user input may include an indication of a customer account or user account associated with the request. For instance, login credentials may be received in addition to or as part of the user input, and the login credentials may indicate a particular user account associated with login credentials that may be stored at a database of the remote server 120.

At step 404, the system 100 may determine the one or more resources 104 of the service provider network 102. For instance, the one or more resource 104 (e.g., the first resource 104*a*, the second resource 104*b*, etc.) may be determined based at least in part on an association of the one or more resources 104 with the customer account or user account. For instance, the system may receive an account identifier (e.g., at step 402) and may search an account directory for resources associated with the account identifier. In some examples, the system may perform one or more operations that include sending API commands to identify the one or more resources 104, such as sending one or more discover commands to the one or more resources 104, sending one or more describe commands to the one or more resources 104, receiving information from an auditing or compliance service in communication with the one or more resources 104 (e.g., AWS CloudTrail), receiving information from a threat detection services in communication with the one or more resources 104 (e.g., AWS GuardDuty), Amazon VPC Flow Logs, DNS Logs, or combinations thereof.

At step 406, the system 100 may receive data from the one or more resources 104. For instance, upon identifying the one or more resources 104 at step 404, the system 100 may establish communication with the one or more resources 104 in order to receive data and data updates from the one or more resources 104. The system 100 may use any of the techniques discussed above for identifying the one or more resources 104 to establish communication channels and/or receive data from the one or more resources 104 (e.g., using API commands). The system 100 may establish a communication channel with an activity log to receive updated information from the one or more resources 104. In some examples, the system 100 may scan for updated information in intervals of 5 seconds, 10 seconds, 20 seconds, 30 seconds, a minute, or any other interval. The system 100 may assign a virtual tracking agent to the one or more resources 104 to generate data (e.g., the first data 106*a*) based on operations performed at or data stored at the one or more resources 104. In some examples, updated data may be received via multiple scans of a data log service that may record substantially all commands occurring at the service provider network 102. For instance, the system 100 may generate a trigger based on detecting the API command, detecting parameters of the API command, and/or detecting a personnel identifier associated with the API commands trigger. In some examples, the trigger may comprise autoscaling groups adding or removing servers in a fleet (e.g., an AWS Elastic Compute Cloud (EC2) fleet), a Lambda function executing in response to a detected security event, Virtual Private Clouds (VPC)s linking together over a peer connection, a performance warning (e.g., via AWS CloudWatch), or combinations thereof. Activation of the trigger may cause the one or more resources 104 to send data related to a discoverable parameter of the one or more resources 104 (e.g., RAM, CPU, etc.).

At step 408, the system 100 may render the first visual indicator 124*a*. For instance, the system 100 may cause the GUI 116 to present the first visual indicator 124*a* on the display 112 at least partly in response to receiving the request (e.g., the user input). In some examples, rendering the first visual indicator 124*a* may comprise changing an attribute of the first visual indicator 124*a* in response to multiple data updates. For instance, the first visual indicator 124*a* may comprise a color, dimension, shade, etc. that is proportional to a changing value of the multiple data updates. For instance, a data update that includes a 10% increase in a particular value may cause a 10% increase in a diameter, or a 10% increase in color brightness, etc. of the three-dimensional object. The first visual indicator 124*a* may pulse in size and/or color to represent the multiple data updates. In some instances, the three-dimensional objects 208 may vary in size to represent the data received from the one or more resources 104, with larger three-dimensional objects representing large databases and/or higher processing capacity servers and smaller three-dimensional objects representing smaller databases and/or lower processing capacity servers. In some examples, the size of the three-dimensional object 208 may represent a remaining memory capacity or usage and/or a CPU usage. For instance, the size of the three-dimensional object 208 representing an Amazon Elastic Cloud Compute (EC2) container may correspond to a usage or remaining capacity of the EC2 container, and may change or pulse to represent changes to the usage or the remaining capacity of the EC2 container.

Where a single data value is received from the one or more resources 104 (e.g., a static data value), the attribute and/or the first visual indicator 124*a* may be rendered as a substantially static visual indicator. In some examples, rendering the first virtual indicator 124*a* may comprise rendering multiple visual indicators, for instance, as multiple three-dimensional objects 208 spaced apart in a virtual three-dimensional space. In some examples, the first visual indicator 124*a* may be rendered onto a display of a VR headset. The first visual indicator 124*a* may pulse in size and/or color to represent the single data value.

At step 410, the system 100 may receive a user input. For instance, the system 100 may receive the user input via the one or more interactive element(s) 126, such as the navigation icon 202. The user input may cause the navigation event (e.g., the zoom event 204*a*, the rotate event 204*b*, and/or the shift event 204*c*) for navigating the three-dimensional graphical representation 122. For instance, the one or more interactive element(s) 126 may comprise one or more icons rendered at the user device 108, such that a selection of the icon(s) via the user input (e.g., a swipe, a tap, a click, etc.) may cause the actuation of the one or more interactive element(s) 126. The one or more interactive element(s) 126 may comprise the visual indicators (e.g., the first visual indicator 124*a*, the second visual indicator 124*b*, etc.) In some instances, the one or more interactive element(s) 126 may comprise a trigger word, such that a voice command including the trigger word detected via the microphone may cause the actuation of the one or more interactive element(s) 126. In some instances, the one or interactive element(s) 126 may comprise a stored motion profile, such that a physical hand gesture or body motion detected via the motion sensor (e.g., camera) may, upon being determined to be similar to the stored motion profile within a confidence interval, cause the actuation of the one or more interactive element(s) 126.

At step 412, the system 100 may render the second visual indicator 124*b*. The second visual indicator 124*b* may be rendered at least partly in response to receiving the input at step 410. The second visual indicator 124*b* may comprise a second visual representation of one or more attributes of the one or more resources 104. For instance, the second visual indicator 124*b* may comprise a shape, a color, a shade, a position, and/or a virtual location, which may represent the second attribute, such as a storage capacity, an activity status, a last time of use, a geographic location etc. The second visual indicator 124*b* may comprise the second side of the cube 206, another cube, another three-dimensional object 208, and/or the text window 212, which may correspond to the second data 106*b*.

Figure 5:
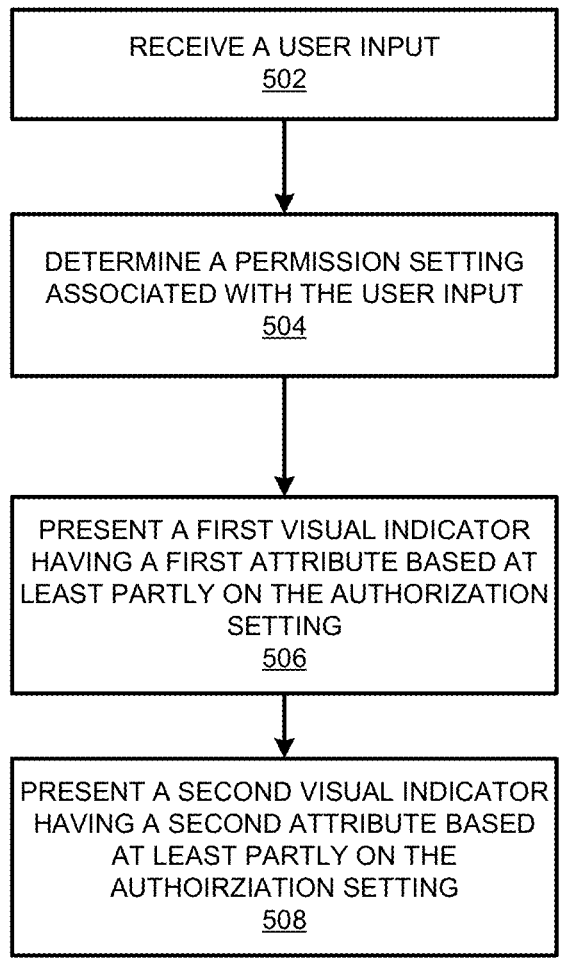
FIG. 5 depicts a flow diagram of a second example method for generating a visual indicator of the three-dimensional graphical representation based at least partly on an permission setting.

FIG. 5 depicts an example method 500 that may be performed by any of the systems discussed herein (e.g., the system 100, the system 200, the system 300, etc.). In some examples, the method 500 may include one or more steps for rendering one or more attributes of the visual indicator(s) based at least partly on an permission setting associated with a user input. Although steps of the method 500 may be performed by any of the systems disclosed herein, the user device 108, the remote server 120, or combinations thereof, the steps are described below as being performed by the system 100 for brevity sake.

At step 502, the system 100 may receive a user input. For instance, the system 100 may receive the user input which may comprise a request to generate the three-dimensional graphical representation 122. The user input may comprise the actuation of the one or more interactive element(s) 126. The user input may include an indication of the user account or a user associated with the request. For instance, login credentials may be received in addition to or as part of the user input, and the login credentials may indicate a particular user account associated with login credentials that may be stored at a database of the remote server 120.

At step 504, the system 100 may determine an permission setting associated with the user input. For instance, in response to receiving the user input, the system 100 may access the user account and determine the permission setting associated with the user account. In some examples, the system 100 may generate an authorization prompt to receive authorization information from the user to determine the permission setting. The system 100 may determine the permission setting based on a device identifier or other device information associated with the user device 108. The permission setting may indicate that a user associated with the user input is authorized, partially authorized, or unauthorized to view the one or more resources 104 or a subset of the one or more resources 104.

At step 506 the system 100 may present the first visual indicator 124*a* having a first attribute based at least partly on the permission setting. For instance, at step 504, the system 100 may determine that the user is unauthorized to access at least a first resource of the one or more resources 104 represented by the visual indicator 124*a* and may, therefore, present the visual indicator 124*a* with a grayed-out shade, dashed-lines, omitting text, or omitting other portions of the first data 106*a* represented by the visual indicator 124*a*

At step 508, the system 100 may present the second visual indicator 124*b* having a second attribute based at least partly on the permission setting. The second attribute may be different than the first attribute based on the permission setting. For instance, the system 100 may determine that the user is authorized to access at least a second resource of the one or more resources 104 represented by the second visual indicator 124*b* and may, therefore, present the second visual indicator 124*b*. having a different attribute than the first visual indicator 124*a*. For instance, the second visual indicator 124*b* may be presented with a color rather than gray-scale, with solid lines (as opposed to dashed lines), and/or presented with text or other additional information represented by the visual indicator 124b (as opposed to the text or other additional information being omitted).

Figure 6:
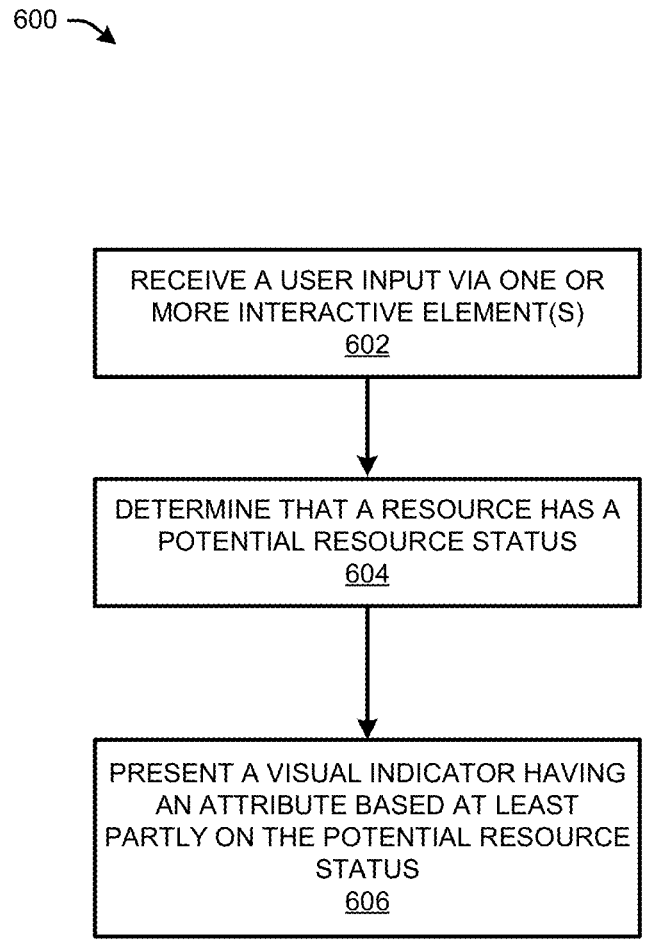
FIG. 6 depicts a flow diagram of a third example method for generating a visual indicator based at least partly on a resource having a potential resource status.

FIG. 6 depicts an example method 600 that may be performed by any of the systems discussed herein (e.g., the system 100, the system 200, the system 300, etc.). In some examples, the method 600 may include one or more steps for presenting a visual indicator representing a resource having a potential resource status. Although steps of the method 600 may be performed by any of the systems disclosed herein, the user device 108, the remote server 120, or combinations thereof, the steps are described below as being performed by the system 100 for brevity sake.

At step 602, the system 100 may receive a user input requesting representation of a resource having a potential resource status. For instance, the user input may be received at the one or more interactive element(s) 126. The user input may be associated with a user account (as discussed above). The system 100 may determine the one or more resources 104 of the service provider network 102 associated with the user account and/or the user that provided the user input. For instance, the user input may be received by the remote server 120 operated by the service provider that provides and/or operates the service provider network 102 for the user. The service provider may send API commands to the one or more resources 104, for instance, via a particular API generated and/or maintained by the service provider to identify the one or more resources 104.

At step 604, the system 100 may determine that a particular resource of the one or more resources 104 has a potential resource status. For instance, the system 100 may identify the particular resource by sending API commands to other network resources or services which may be operated by the service provider and may be currently unassociated with the user account (e.g., not forming a portion of the service provider network 102 provided to the user by the network provider). The system 100 may determine that the particular resource fits a demand of the user account, for instance, based on a traffic flow metric, a usage capacity metric, or other performance metric that may be associated with the user account and/or generated by the service provider to manage the user account. As such, the system 100 may determine that the particular resource has the potential resource status based at least partly on determining an availability of the particular resource to form a portion of the service provider network 102 and/or based on determining that the particular resource is absent from at least a portion of service provider network 102.

At step 606, the system 100 may present a visual indicator having an attribute based at least partly on the potential resource status. For instance, one or more components of the system 100 (e.g., the user device 108, the remote server 120, etc.) may cause the GUI 116 to present a visual indicator representing that the particular resource of the one or more resource(s) 104 is currently absent from a portion of the service provider network 102 and/or is available to form a portion of the service provider network 102. For instance, the system 100 may present the visual indicator having a color, shade, size, three-dimensional shape, position, location, motion, outlining, or combinations thereof that are different than other resources that already form a portion of the service provider network 102. The system 100 may present a visual indicator including text describing the potential resource status, such as instructions for adding the potential resource to the service provider network 102.

Although FIGS. 4-6 illustrate example steps, the described steps in these figures (and all other methods, techniques, and operations disclosed herein) may be performed in other orders different than those illustrated in FIGS. 4-6, and multiple steps may be performed simultaneously or in parallel. Furthermore, in some embodiments, one or more steps illustrated in FIGS. 4-6 may be omitted, repeated, and/or combined with any other steps illustrated in FIGS. 4-6 or any other operations and components discussed in this disclosure. Any steps illustrated in FIGS. 4-6 may be performed at least partly in response to any of the steps illustrated in FIGS. 4-6. In some instances, the steps illustrated in FIG. 4-6 may be performed in multiple iterations for instance, to generate hundreds, thousands, or even millions of three-dimensional graphical representations 122 of service provider networks 102 comprising hundreds, thousands, or even millions of the network resources across the globe.

Figure 7:
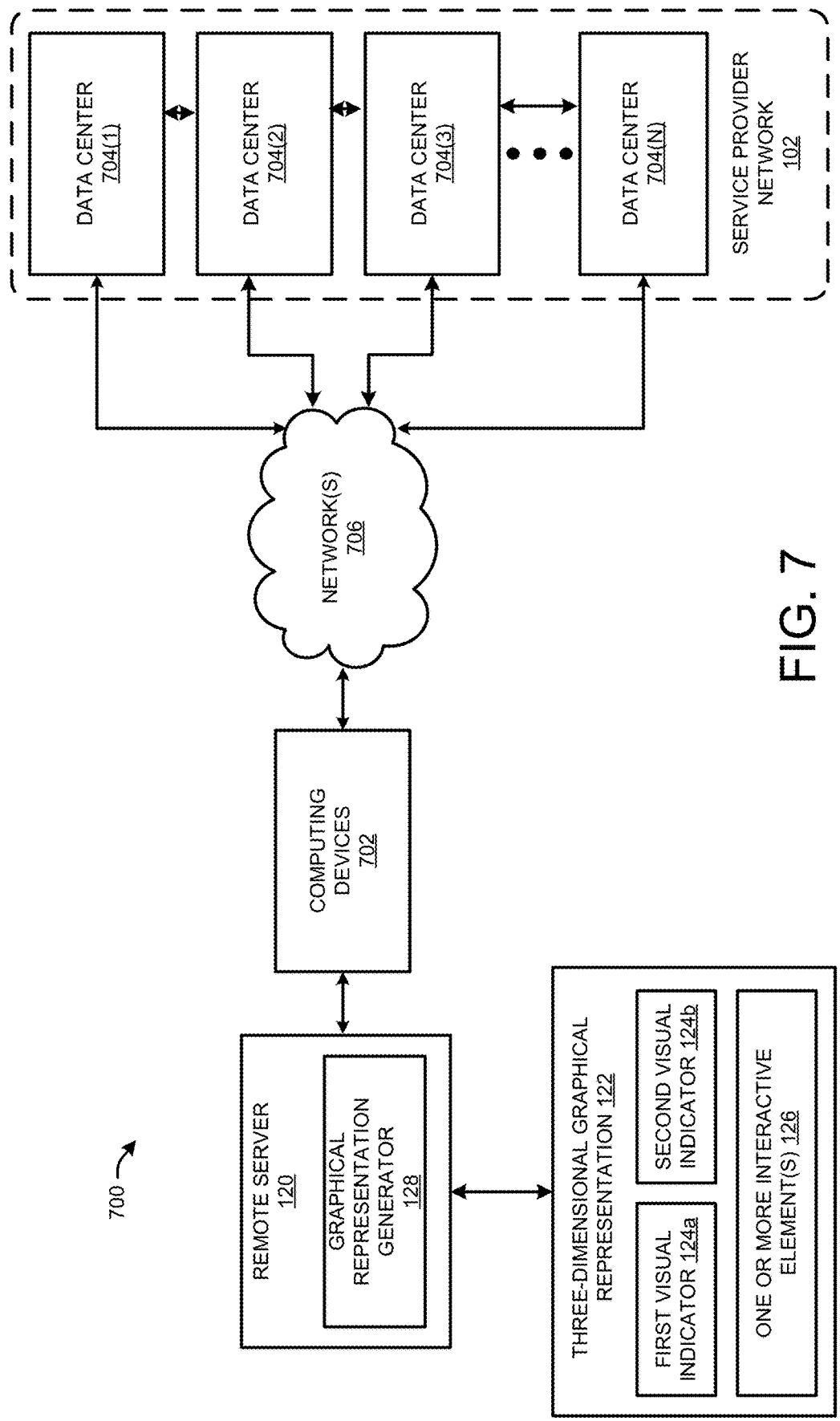
FIG. 7 depicts a block diagram that shows one illustrative operating environment for the examples disclosed herein that includes a service provider network.

FIG. 7 depicts a block diagram that shows an illustrative operating environment 700 for the examples disclosed herein that includes the service provider network 102. FIG. 7 and the following description are intended to provide a brief, general description of a suitable computing environment in which the examples described herein may be implemented. In particular, FIG. 7 is a system and network diagram that shows an illustrative operating environment that includes one or more computing devices 702, the service provider network 102, and the three-dimensional graphical representation 122. The one or more computing devices 702 may comprise the user device 108, the remote server 120, or any of the devices discussed herein. As discussed above, the service provider network 102 can provide virtual machine instances and computing resources on a permanent or an as-needed basis.

The computing resources (e.g., the one or more resources 104) provided by the service provider network 102 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 102 are enabled in one implementation by one or more data centers 704(1)-704(N) (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. The computing resources depicted in FIG. 7 may be represented by the visual indicators (e.g., the first visual indicator 124a, the second visual indicator 124b, etc.) of the three-dimensional graphical representation 122. One illustrative configuration for a data center 704 that implements some or all of the concepts and technologies disclosed herein will be described below with regard to FIG. 8.

The users and customers of service provider network 102 may access the computing resources provided by the data centers 704 over a suitable data communications network, such as a Wide Area Network ("WAN"), as illustrated by network(s) 706. Although a WAN might be used, it should be appreciated that a local-area network ("LAN"), the Internet, or any other networking topology known in the art that connects the data centers 704 to the computing devices 702 (such as the user devices 108 or the remote server 120 illustrated in FIG. 1) may be utilized. It should also be appreciated that combinations of such networks might also be utilized.

Figure 8:
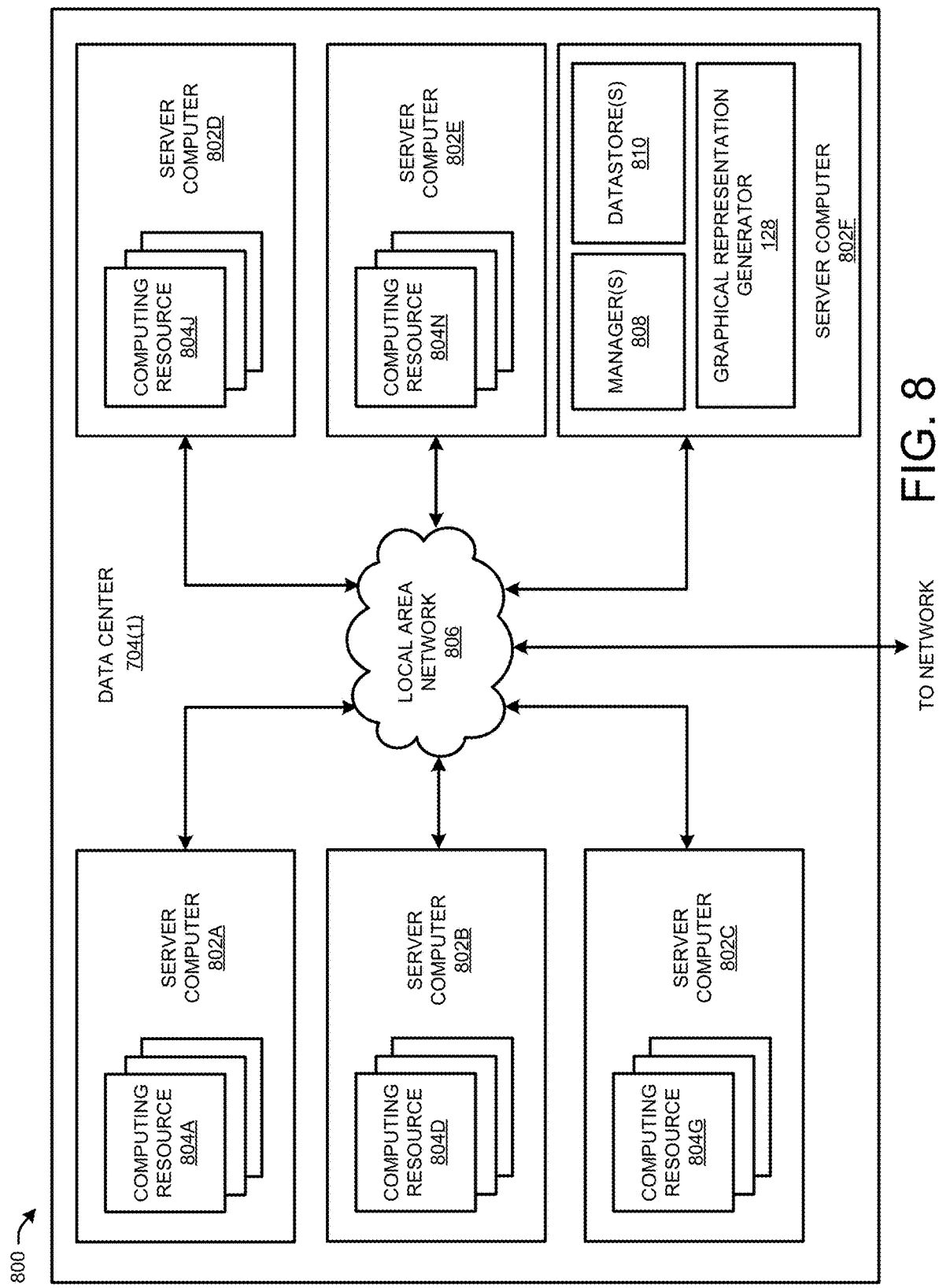
FIG. 8 depicts a block diagram that illustrates one configuration for a data center that implements aspects of a service provider network, including some or all of the concepts and technologies disclosed herein.

FIG. 8 is a block diagram that illustrates an illustrative architecture 800 of one configuration for a data center 704 that implements aspects of the service provider network 102, including some or all of the concepts and technologies disclosed herein. The example data center 704(1) shown in FIG. 8 includes several server computers 802A-802F (which may be referred to herein singularly as "a server computer 802" or in the plural as "the server computers 802") for providing computing resources (e.g., the one or more resources 104). The server computers 802 may be standard tower or rack-mount server computers configured appropriately for providing the computing resources described herein. According to an example, the server computers 802 are configured to execute the software products as described above.

In an example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager capable of instantiating and managing computing resources and instances of computing resources. In the case of virtual machine instances, for example, the instance manager might be a hypervisor, or another type of program configured to enable the execution of multiple virtual machine instances on a single server computer 802.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 704(1) shown in FIG. 8 also includes a server computer 802F reserved for executing software components for managing the operation of the data center 704(1), the server computers 802, virtual machine instances, and other resources within the service provider network 102. The server computer 802F might also execute one or more managers 808 and include one or more datastores 810, and the graphical representation generator 128. In this regard, it should be appreciated that while these components are illustrated as executing within service provider network 102, computing systems that are external to service provider network 102 might also be utilized to execute some or all of these components. For instance, the remote server 120 may be separate from the service provider network 102 or the remote server 120 may form a part of the service provider network 102. Other configurations might also be utilized.

In the example data center 704(1) shown in FIG. 8, an appropriate local area network ("LAN") 806 is utilized to interconnect the server computers 802A-802E and the server computer 802F. The LAN 806 is also connected to the network(s) 706 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704(1)-704(N), between each of the server computers 802A-802F in each data center 704 and between virtual machine instances and other types of computing resources provided by the service provider network 102.

It should be appreciated that the data center 704(1) described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A method comprising:
   receiving, from a user device of a user, a request to render a three-dimensional graphical representation of a service provider network associated with an account of the user;
   receiving first data generated by a first resource comprising an instance of a container provided by the service provider network, wherein the first data indicates one or more first attributes of the first resource and is a first type, the one or more first attributes indicating at least one of a first processing capacity or a first storage availability of the first resource;
   receiving second data generated by a second resource, wherein the second data indicates one or more second attributes of the second resource and is a second type that is different than the first type, the one or more second attributes indicating at least one of a second processing capacity or a second storage availability of the second resource;
   causing, in response to receiving the request and via a graphical user interface (GUI) accessible by the user device, a first visual indicator representing the first data and a second visual indicator representing the second data to be visually rendered;
   receiving, via an interactive element displayed via the GUI, an input to cause an event in the three-dimensional graphical representation;
   determining third data generated by the one or more resources; and
   causing, in response to receiving the input and via the GUI, a third visual indicator representing the third data to be visually rendered.

2. The method of claim 1, further comprising:
determining that the first resource comprises a first type of resource associated with a first three-dimensional shape;
causing the first visual indicator to be visually rendered as the first three-dimensional shape;
determining that the second resource comprises a second type of resource associated with a second three-dimensional shape that is different than the first three-dimensional shape; and
causing the second visual indicator to be visually rendered as the second three-dimensional shape.

3. The method of claim 2, wherein the third data is generated by the first resource, and the event comprises a navigation event including one or more of:
a zoom from a first view including the first visual indicator on a first side of the first three-dimensional object to a second view including the third visual indicator on the first side of the first three-dimensional object;
a shift along a traversal line from the first view including the first visual indicator to a third view including the second visual indicator; or
a rotation from the first view including the first visual indicator on the first side of the first three-dimensional shape to a fourth view including the second visual indicator on a second side of the first three-dimensional shape.

4. The method of claim 2, wherein the third data indicates a relation between the first resource and the second resource, and the third visual indicator comprises a connector between the first three-dimensional object and the second three-dimensional object.

5. The method of claim 1, wherein the first visual indicator comprises at least a portion of a three-dimensional object, and the second visual indicator comprises text adjacent to, spaced a distance apart from, or at least partially disposed over the three-dimensional object.

6. The method of claim 1, wherein the first data comprises computer processing information or memory storage information associated with a first resource associated with a first timestamp, the input comprises a second request to generate a historical representation instance of the service provider network, and the third data is received in response to the second request and comprises the computer processing information or the memory storage information associated with a second timestamp indicating a time occurring prior to the first timestamp.

7. A system comprising:
a processor; and
computer-readable media storing instructions that, when executed, cause the system to:
receive a request to render a three-dimensional graphical representation of a service provider network;
determine an account associated with the request;
determine a first resource and a second resource of the service provider network associated with the account, the first resource comprising an auditing or compliance service provided by the service provider network and the second resource comprising a virtual machine (VM) instance provided by the service provider network;
determine first data associated with the first resource, wherein the first data indicates one or more first attributes of the first resource and is a first data type, the one or more first attributes indicating at least one of a first processing capacity or a first storage availability of the first resource;
determine second data associated with the second resource, wherein the second data indicates one or more second attributes of the second resource and is a second data type that is different than the first type, the one or more second attributes indicating at least one of a second processing capacity or a second storage availability of the second resource;
determine a first visual indicator comprising a first three-dimensional object having a first attribute that visually represents the first data;
determine a second visual indicator comprising a second three-dimensional object having a second attribute that visually represents the second data; and
cause, at least partly in response to the request and via a graphical user interface (GUI), the three-dimensional graphical representation to be rendered to include:
the first visual indicator;
the second visual indicator; and
one or more interactive elements that, upon receiving a user input, cause at least one of:
an occurrence of a navigation event within the three-dimensional graphical representation; or
generation of an instance of the three-dimensional graphical representation.

8. The system of claim 7, wherein the first data comprises multiple data updates and the first attribute comprises an attribute that appears to change in response to the multiple data updates.

9. The device of claim 7, wherein:
the first three-dimensional object corresponds to first object data;
the second three-dimensional object corresponds to second object data; and
the computer-readable media stores further instructions that, when executed, cause the system to:
receive third data corresponding to network data associated with the first resource and the second resource; and
generate a third visual indicator comprising a connector between the first three-dimensional object and the second three-dimensional object.

10. The system of claim 7, wherein:
the first attribute has a value corresponding to the first data; and
the first attribute comprises at least one of a size, a color, a shade, or a shape of the first three-dimensional object.

11. The system of claim 10, wherein the one or more first attributes indicate at least one of a current processing power usage, a current memory storage usage, or a geographic region.

12. The system of claim 7, wherein the one or more interactive elements, upon receiving the user input, cause the device to:
generate the instance as a first instance of the three-dimensional graphical representation based at least partly on the first data and a first timestamp; and
generate a second instance of the three-dimensional graphical representation based at least partly on the second data associated with the second resource and a second timestamp that is different than the first timestamp.

13. The system of claim 12, wherein the computer-readable media store further instructions that, when executed, cause the first instance and the second instance to be rendered adjacent to each other via a graphical user interface (GUI).

14. A system comprising:

a processor; and computer-readable media storing instructions that, when executed by the processor, cause the system to:

receive a request to render a three-dimensional graphical representation of a service provider network;

determine an account associated with the request;

determine that one or more resources of the service provider network are associated with the account, a particular resource of the one or more resources comprising an instance of a container provided by the service provider network;

receive data from the one or more resources, wherein the data comprises multiple different types of data and indicates at least one of a processing capacity or a storage availability of the one or more resources; and cause a graphical user interface (GUI) to present:

a first visual indicator comprising a first three-dimensional object having a first attribute based at least partly on a first portion of the data; and a second visual indicator comprising a second three-dimensional object having a second attribute that is different than the first attribute based at least partly on a second portion of the data.

15. The system of claim 14, wherein the instructions, when executed, further cause the system to:

determine a permission setting associated with the request;

present the first attribute comprising a first shading or a first color; and present the second attribute comprising a second shading that is different than the first shading or a second color that is different than the first color based at least partly on the permission setting.

16. The system of claim 14, wherein the instructions, when executed, further cause the system to:

determine that a resource of the one or more resources has a potential resource status based at least partly on an availability of the resource to form a portion of the service provider network; and present the second visual indicator having the second attribute based at least partly on the potential resource status.

17. The system of claim 14, wherein the request comprises a first request and the instructions, when executed, further cause the system to:

receive a second request to generate an instance of the three-dimensional graphical representation;

receive a time input from a user associated with the request; and receive the data from the one or more resources based at least partly on the time input.

18. The system of claim 14, wherein the instructions, when executed, further cause the system to identify the one or more resources via one or more of:

sending one or more discover commands to the one or more resources;

sending one or more describe commands to the one or more resources;

an auditing service in communication with the one or more resources;

a compliance service in communication with the one or more resources; or a threat detection service in communication with the one or more resources.

19. The system of claim 14, wherein:

the first three-dimensional object comprises a cube representing a first object resource of the service provider network;

the first attribute comprises a first dimension of the cube determined by a first performance value associated with the first object resource;

the second three-dimensional object comprises a sphere representing a second object resource of the service provider network that is different than the first object resource;

the second attribute comprises a second dimension of the sphere determined by a second performance value associated with the second object resource; and the instructions, when executed, further cause the system to present a third visual indicator connecting the cube to the sphere, the third visual indicator representing third data based at least partly on a communication between the first object resource and the second object resource.

20. The system of claim 19, wherein the request is received at a server device associated with a service provider entity that:

provides the one or more resources of the service provider network; and maintains the account.

* * * * *